United States Patent
Yamaguchi

(10) Patent No.: US 10,351,208 B2
(45) Date of Patent: Jul. 16, 2019

(54) BICYCLE REAR DERAILLEUR

(71) Applicant: Shimano Inc., Sakai, Osaka (JP)

(72) Inventor: Sota Yamaguchi, Osaka (JP)

(73) Assignee: Shimano Inc., Osaka (JP)

(*) Notice: Subject to any disclaimer, the term of this patent is extended or adjusted under 35 U.S.C. 154(b) by 259 days.

(21) Appl. No.: 15/442,172

(22) Filed: Feb. 24, 2017

(65) Prior Publication Data

US 2018/0244345 A1    Aug. 30, 2018

(51) Int. Cl.
*B62M 9/122*    (2010.01)
*B62M 9/1244*    (2010.01)

(52) U.S. Cl.
CPC .......... *B62M 9/122* (2013.01); *B62M 9/1244* (2013.01)

(58) Field of Classification Search
CPC .... B62M 9/122; B62M 9/123; B62M 9/1242; B62M 9/124; B62M 9/1244
See application file for complete search history.

(56) References Cited

U.S. PATENT DOCUMENTS

| | | | |
|---|---|---|---|
| 6,135,904 A | 10/2000 | Guthrie | |
| 8,852,041 B2 | 10/2014 | Yamaguchi et al. | |
| 8,870,692 B2 | 10/2014 | Yamaguchi et al. | |
| 8,870,693 B2 | 10/2014 | Shahana et al. | |
| 8,882,618 B2 | 11/2014 | Yamaguchi et al. | |
| 8,900,078 B2 | 12/2014 | Yamaguchi et al. | |
| 9,290,235 B2 | 3/2016 | Yamaguchi | |
| 9,394,030 B2* | 7/2016 | Shipman | B62M 9/132 |
| 9,656,723 B1* | 5/2017 | Tachibana | B62M 9/122 |
| 2002/0082128 A1* | 6/2002 | Fukuda | B62M 9/122 474/70 |
| 2006/0183584 A1* | 8/2006 | Fukuda | B62M 9/12 474/70 |
| 2009/0098963 A1* | 4/2009 | Watarai | B62K 23/06 474/80 |
| 2012/0083372 A1 | 4/2012 | Yamaguchi et al. | |

\* cited by examiner

*Primary Examiner* — Michael R Mansen
*Assistant Examiner* — Robert T Reese
(74) *Attorney, Agent, or Firm* — Global IP Counselors, LLP

(57) ABSTRACT

A bicycle rear derailleur is basically provided a base member, a movable member, a chain guide and a resistance applying structure. The base member is configured to be mounted to a bicycle. The movable member is movably coupled to the base member. The chain guide is rotatably coupled to the movable member around a first rotational axis. The resistance applying structure includes a friction applying member that applies a frictional resistance to rotational movement of the chain guide. The resistance applying structure is offset from the first rotational axis.

22 Claims, 12 Drawing Sheets

BICYCLE REAR DERAILLEUR

BACKGROUND

Field of the Invention

This invention generally relates to a bicycle derailleur. More specifically, the present invention relates to a bicycle derailleur that includes a resistance applying unit that provides rotational resistance of a chain guide.

Background Information

A bicycle typically uses a chain drive transmission for transmitting a pedaling force to a rear wheel. The chain drive transmission of a bicycle often uses derailleurs to selectively move a chain from one of a plurality of sprockets to another to change the speed of the bicycle. A typical derailleur has a base member, a movable member supporting a chain guide and a linkage assembly (e.g., a moving mechanism) coupled between the base member and the movable member so that the chain guide moves laterally relative to the base member.

SUMMARY

Generally, the present disclosure is directed to various features of a rear derailleur that includes a resistance applying structure. In conventional derailleurs with a resistance applying structure, the axial width of the movable member typically increases due to the addition of the resistance applying structure as compared to derailleurs without a resistance applying structure.

In view of the state of the known technology and in accordance with a first aspect of the present disclosure, a rear derailleur is provided that comprises a base member, a movable member, a chain guide and a resistance applying structure. The base member is configured to be mounted to a bicycle. The movable member is movably coupled to the base member. The chain guide is rotatably coupled to the movable member around a first rotational axis. The resistance applying structure includes a friction applying member that applies a frictional resistance to rotational movement of the chain guide. The resistance applying structure is offset from the first rotational axis. Advantageously according to the first aspect, the rear derailleur is configured such that an axial width of the movable member with respect to a rotational center axis of a bicycle sprocket could be reduced. Thus, the rear derailleur is configured to have a low profile in an axial direction of a bicycle frame when the rear derailleur is mounted to the bicycle frame.

In accordance with a second aspect of the present invention, a rear derailleur is provided that comprises a base member, a movable member, a chain guide, a resistance applying structure and a speed changing mechanism. The base member is configured to be mounted to a bicycle. The movable member is movably coupled to the base member. The chain guide is rotatably coupled to the movable member around a first rotational axis. The resistance applying structure includes a friction applying member that applies a frictional resistance to rotational movement of the chain guide. The speed changing mechanism is configured to transmit the rotational movement of the chain guide to the resistance applying structure. Advantageously according to the second aspect, the rear derailleur is configured such that a rotational speed that is transmitted to the second torque transmitting wheel could be changed.

In accordance with a third aspect of the present invention, the rear derailleur according to the first aspect further comprises a speed changing mechanism configured to transmit the rotational movement of the chain guide to the resistance applying structure. Advantageously according to the third aspect, the rear derailleur is configured such that a rotational speed that is transmitted to the second torque transmitting wheel could be changed.

In accordance with a fourth aspect of the present invention, the rear derailleur according to the third aspect is configured so that the speed changing mechanism further includes a first torque transmitting wheel and a second torque transmitting wheel. The first torque transmitting wheel is rotatably arranged around the first rotational axis. The second torque transmitting wheel is rotatably arranged around the second rotational axis. Advantageously according to the fourth aspect, the rear derailleur is configured such that an axial width of the movable member with respect to a rotational center axis of a bicycle sprocket could be reduced. Thus, the rear derailleur is configured to have a low profile in an axial direction of a bicycle frame when the rear derailleur is mounted to the bicycle frame.

In accordance with a fifth aspect of the present invention, the rear derailleur according to the fourth aspect is configured so the first torque transmitting wheel and the second torque transmitting wheel are rotatably connected to each other. Advantageously according to the fifth aspect, the rear derailleur is configured such that an axial width of the movable member with respect to a rotational center axis of a bicycle sprocket could be reduced. Thus, the rear derailleur is configured to have a low profile in an axial direction of a bicycle frame when the rear derailleur is mounted to the bicycle frame.

In accordance with a sixth aspect of the present invention, the rear derailleur according to the fifth aspect is configured so that the first torque transmitting wheel and the second torque transmitting wheel are directly engaged with each other. Advantageously according to the sixth aspect, the rear derailleur is configured such that a total weight of the bicycle rear derailleur could be reduced because a torque transmitting member does not need to be provided between the first and second transmitting wheels.

In accordance with a seventh aspect of the present invention, the rear derailleur according to the fifth or sixth aspect is configured so that the first torque transmitting wheel includes a plurality of first transmitting teeth. The second torque transmitting wheel includes a plurality of second transmitting teeth that engage with the first transmitting teeth. Advantageously according to the seventh aspect, the rear derailleur is configured such that an axial width of the movable member with respect to a rotational center axis of a bicycle sprocket could be reduced. Thus, the rear derailleur is configured to have a low profile in an axial direction of a bicycle frame when the rear derailleur is mounted to the bicycle frame.

In accordance with an eighth aspect of the present invention, the rear derailleur according to any one of the fourth to seventh aspects is configured so that the first torque transmitting wheel has a first diameter. The second torque transmitting wheel has a second diameter that is different from the first diameter. Advantageously according to the eighth aspect, the rear derailleur is configured such that a rotational speed that is transmitted to the second torque transmitting wheel can be altered.

In accordance with a ninth aspect of the present invention, the rear derailleur according to the eighth aspect is configured so that the first diameter is larger than the second diameter. Advantageously according to the ninth aspect, the rear derailleur is configured such that a rotational speed that is transmitted to the second torque transmitting wheel can be increased. If the friction force applied to the friction applied member is as the substantially same as the conventional manner, the frictional resistance to the rotational movement of the chain guide can be increased. If the frictional force applied to the friction applied member is reduced, the frictional resistance to the rotational movement of the chain guide can be as the substantially same as that of the conventional rear derailleur but abrasion resistance is improved.

In accordance with a tenth aspect of the present invention, the rear derailleur according to the ninth aspect is configured so that the first diameter is twice as large as the second diameter. Advantageously according to the tenth aspect, the rear derailleur is configured such that a rotational speed that is transmitted to the second torque transmitting wheel can be altered.

In accordance with an eleventh aspect of the present invention, the rear derailleur according to any one of the seventh to tenth aspects is configured so that a first total tooth number of the first transmitting teeth is different from a second total tooth number of the second transmitting teeth. Advantageously according to the eleventh aspect, the rear derailleur is configured such that an axial width of the movable member with respect to a rotational center axis of a bicycle sprocket could be reduced. Thus, the rear derailleur is configured to have a low profile in an axial direction of a bicycle frame when the rear derailleur is mounted to the bicycle frame.

In accordance with a twelfth aspect of the present invention, the rear derailleur according to the eleventh aspect is configured so that the first total tooth number of the first transmitting teeth is larger than the second total tooth number of the second transmitting teeth. Advantageously according to the twelfth aspect, the rear derailleur is configured such that a rotational speed that is transmitted to the second torque transmitting wheel can be altered.

In accordance with a thirteenth aspect of the present invention, the rear derailleur according to the eleventh or twelfth aspects is configured so that the first total tooth number is twice as many as the second total tooth number. Advantageously according to the thirteenth aspect, the rear derailleur is configured such that an axial width of the movable member with respect to a rotational center axis of a bicycle sprocket could be reduced. Thus, the rear derailleur is configured to have a low profile in an axial direction of a bicycle frame when the rear derailleur is mounted to the bicycle frame.

In accordance with a fourteenth aspect of the present invention, the rear derailleur according to any one of the first to thirteenth aspects is configured so that the resistance applying structure further includes a friction applied member. One of the friction applying member and the friction applied member is rotatable around a second rotational axis that is offset from the first rotational axis. Advantageously according to the fourteenth aspect, the rear derailleur is configured such that an axial width of the movable member with respect to a rotational center axis of a bicycle sprocket could be reduced. Thus, the rear derailleur is configured to have a low profile in an axial direction of a bicycle frame when the rear derailleur is mounted to the bicycle frame.

In accordance with a fifteenth aspect of the present invention, the rear derailleur according to any one of the first to fourteenth aspects further comprises a one-way clutch that is operatively coupled between the movable member and the chain guide to transmit the frictional resistance of the friction applying member to rotational movement of the chain guide in a predetermined direction. Advantageously according to the fifteenth aspect, the rear derailleur is configured such that the frictional resistance to the rotational movement of the chain guide can be applied in one rotational direction that is a counterclockwise direction as viewed from a non-frame facing side of the rear derailleur.

In accordance with a sixteenth aspect of the present invention, the rear derailleur according to the fifteenth aspect is configured so that the resistance applying structure includes the one-way clutch. Advantageously according to the sixteenth aspect, the rear derailleur is configured such that an axial width of the movable member with respect to a rotational center axis of a bicycle sprocket could be reduced. Thus, the rear derailleur is configured to have a low profile in an axial direction of a bicycle frame when the rear derailleur is mounted to the bicycle frame.

In accordance with a seventeenth aspect of the present invention, the rear derailleur according to any one of the fourth to sixteenth aspects is configured so that the first torque transmitting wheel and the second torque transmitting wheel are made of a metallic material. Advantageously according to the seventeenth aspect, the rear derailleur is configured such that the durability of the first and second torque transmitting wheels is improved.

In accordance with an eighteenth aspect of the present invention, the rear derailleur according to any one of the fourth to sixteenth aspects is configured so that the first torque transmitting wheel and the second torque transmitting wheel are made of a non-metallic material. Advantageously according to the eighteenth aspect, the rear derailleur is configured such that a total weight of the bicycle rear derailleur can be reduced.

In accordance with a nineteenth aspect of the present invention, the rear derailleur according to any one of the first to the eighteenth aspects further comprises a cable attachment portion to which a mechanical control cable is attached. Advantageously according to the nineteenth aspect, the rear derailleur is configured such that an axial width of the movable member with respect to a rotational center axis of a bicycle sprocket could be reduced. Thus, the rear derailleur is configured to have a low profile in an axial direction of a bicycle frame when the rear derailleur is mounted to the bicycle frame.

In accordance with a twentieth aspect of the present invention, the rear derailleur according to any one of the first to nineteenth aspects further comprises an electrical actuator to move the movable member relative to the base member. Advantageously according to the twentieth aspect, the rear derailleur is configured such that an axial width of the movable member with respect to a rotational center axis of a bicycle sprocket could be reduced. Thus, the rear derailleur is configured to have a low profile in an axial direction of a bicycle frame when the rear derailleur is mounted to the bicycle frame.

In accordance with a twenty-first aspect of the present invention, the rear derailleur according to the twentieth aspect further comprises a wireless communication unit configured to receive a control signal to operate the electrical actuator. Advantageously according to the twenty-first aspect, the rear derailleur is configured such that an axial width of the movable member with respect to a rotational center axis of a bicycle sprocket could be reduced. Thus, the rear derailleur is configured to have a low profile in an axial direction of a bicycle frame when the rear derailleur is mounted to the bicycle frame.

In accordance with a twenty-second aspect of the present invention, the rear derailleur according to any one of the first to twenty-first aspects is configured so that the resistance applying structure includes a resistance control element that moves between at least a first position and a different second position. The resistance control element is operatively coupled to the resistance applying member. The resistance applying structure applies a first resistance to rotational movement of the chain guide when the resistance control element is disposed in the first position. The resistance applying structure applies a different second resistance to rotational movement of chain guide when the resistance control element is disposed in the second position. Advantageously according to the twenty-second aspect, the rear derailleur is configured such that a user can operate whether a function of the resistance applying structure is available or not.

Also other objects, features, aspects and advantages of the disclosed rear derailleur will become apparent to those skilled in the art from the following detailed description, which, taken in conjunction with the annexed drawings, discloses one embodiment of the rear derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
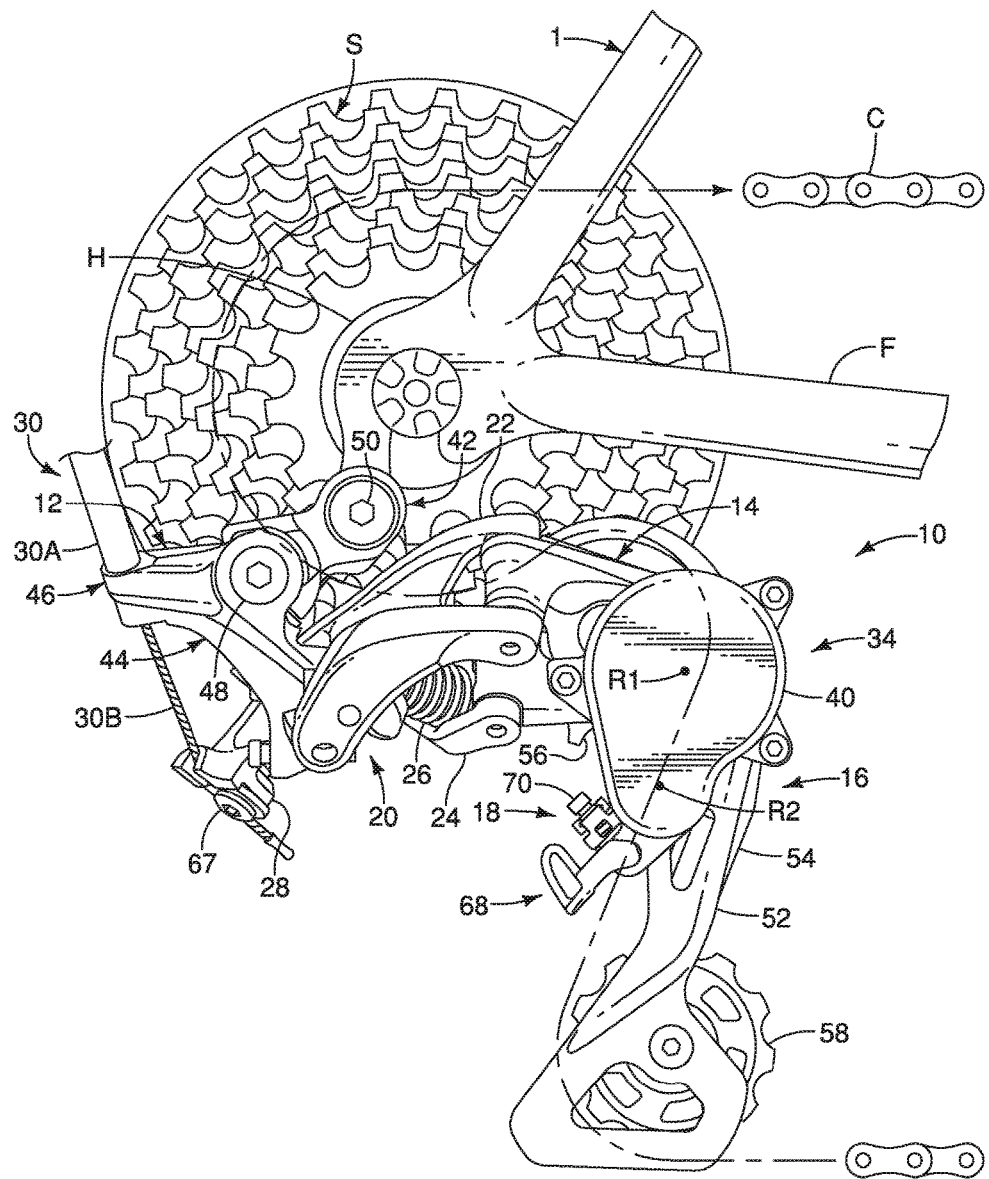
FIG. 1 is a side elevational view of a rear portion of a bicycle frame equipped with a rear sprocket assembly and a rear derailleur having a resistance applying structure and a speed changing mechanism, in accordance with one illustrated embodiment.

Referring initially to FIG. 1, a rear portion of a bicycle 1 is illustrated that is equipped with a bicycle rear derailleur 10 in accordance with one illustrated embodiment. The bicycle rear derailleur 10 comprises a base member 12, a movable member 14, a chain guide 16 and a resistance applying structure 18. The chain guide 16 is rotatable with respect to the movable member 14 about a first rotational axis R1. The resistance applying structure 18 is attached to the movable member 14. In this way, the movable member 14 can have a low profile with respect to the bicycle 1. The resistance applying structure 18 is offset from the first rotational axis R1. The rear derailleur 10 is configured to shift a bicycle chain C between a plurality of rear sprockets S. The rear sprockets S are mounted on a freewheel (not shown) of a rear hub H in a conventional manner to transmit drive torque to a rear bicycle wheel (not shown).

The bicycle rear derailleur 10 further comprises a linkage assembly 20 interconnecting the base member 12 and the movable member 14. In particular, in the illustrated embodiment, the linkage assembly 20 includes a first link 22 and a second link 24. The rear derailleur 10 further comprises a biasing element 26 (tension spring) interposed between the first and second links 22 and 24 to bias the movable member 14 and the chain guide 16 towards the top gear position. As used herein, the term "top shift (gear) stage position" refers to the rear derailleur 10 being in an operating position that corresponds to the bicycle chain C being guided onto the one of the rear sprockets S with the smallest number of teeth that is located farthest away from a center longitudinal plane of the bicycle frame F. As used herein, the term "low shift (gear) stage position" refers to the rear derailleur 10 being in an operating position that corresponds to the bicycle chain C being guided onto the one of the rear sprockets S with the largest number of teeth that is located closest to the center longitudinal frame of the bicycle frame F. The bicycle rear derailleur 10 further includes a cable attachment portion 28 that receives a mechanical control cable 30. The control cable 30 includes an outer casing 30A and an inner wire 30B. The inner wire 30B is operable by a shifter (not shown) to shift the chain guide 16 between the top and low gear positions via operation of a shifter.

The rear derailleur 10 is provided with the resistance applying structure 18 to help prevent chain bounce and maintain the desired chain tension of the bicycle chain C during riding. In particular, the resistance applying structure 18 is provided such that when the chain guide 16 rotates in a predetermined direction, the resistance of the movement of the chain guide 16 in the predetermined direction is increased. In the illustrated embodiment, the chain guide 16 pivots about the first rotational axis R1 in the predetermined direction, which corresponds to a first rotational direction D1 (as seen FIG. 4). A first rotational direction D1 corresponds to a counterclockwise direction about the first rotational axis R1 as viewed from a non-frame facing side of the rear derailleur 10. As will be further explained below, the chain guide 16 is biased in a second rotational direction D2 about the first rotational axis R1. The second rotational direction D2 is opposite the first rotational direction D1 with respect to the first rotational axis R1.

Figure 8:
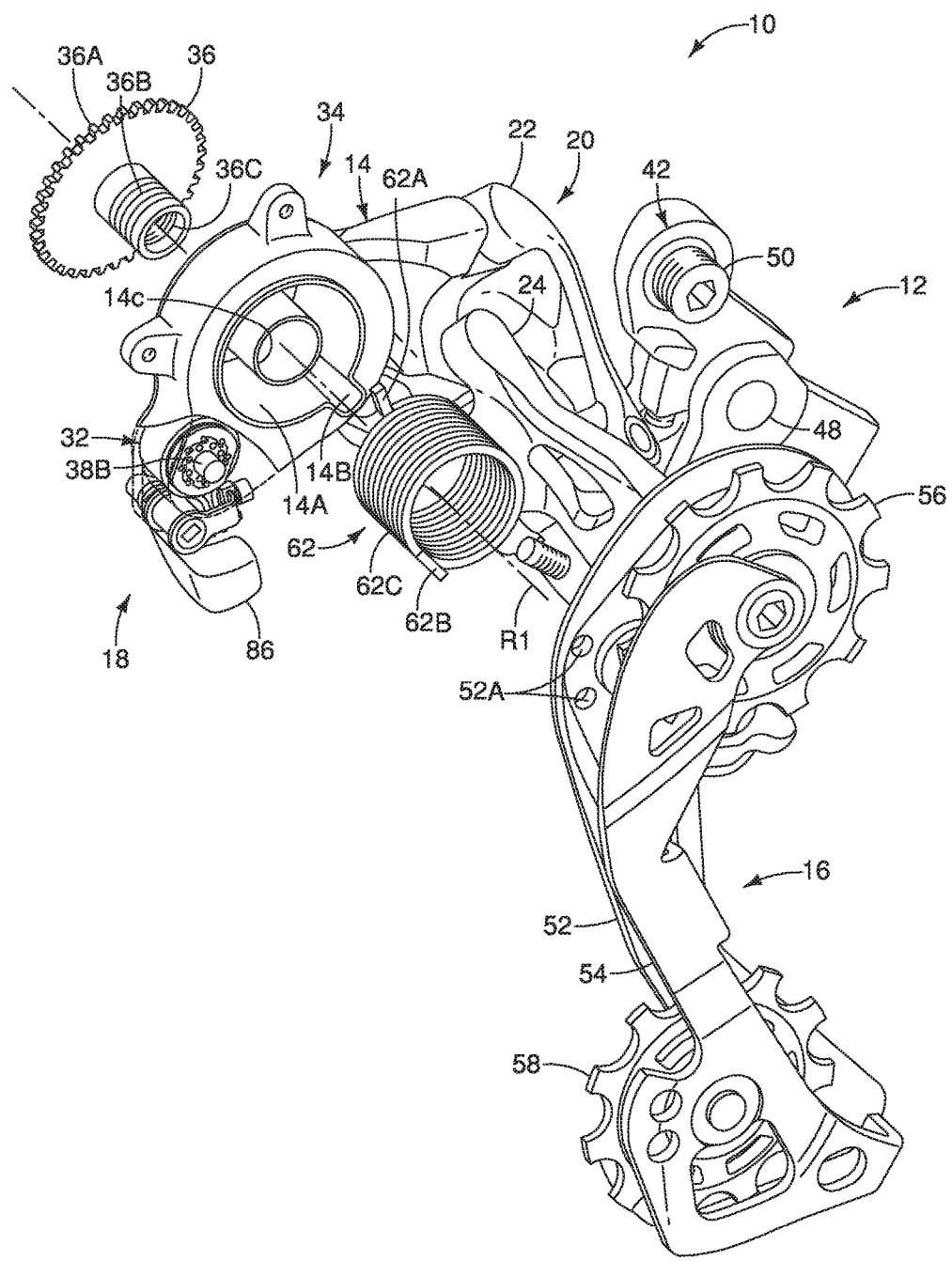
FIG. 8 is an enlarged perspective view of the rear derailleur of FIGS. 1 to 7, with the chain guide and a portion of the speed changing mechanism exploded from the movable member and a portion of the movable member broken away to show the resistance applying structure.

Referring now to FIG. 8, the bicycle rear derailleur 10 further includes a one-way clutch 32. Basically, the one-way clutch 32 disconnects the resistance applying structure 18 when the chain guide 16 pivots in the second rotational direction D2. However, the one-way clutch 32 connects the resistance applying structure 18 when the chain guide 16 pivots in the first rotational direction D1. Specifically, the resistance applying structure 18 only applies a frictional resistance to the rotation of the chain guide 16 via the one-way clutch 32 when the chain guide 16 pivots in the first rotational direction D1, as discussed below.

The bicycle rear derailleur 10 further includes a speed changing mechanism 34. The speed changing mechanism 34 operatively couples the chain guide 16 to the resistance applying structure 18. The speed changing mechanism 34 changes the speed at which the chain guide 16 rotates about the first rotational axis R1 in the first rotational direction D1 by transmitting the frictional resistance to the resistance applying structure 18 to the chain guide 16.

Figure 3:
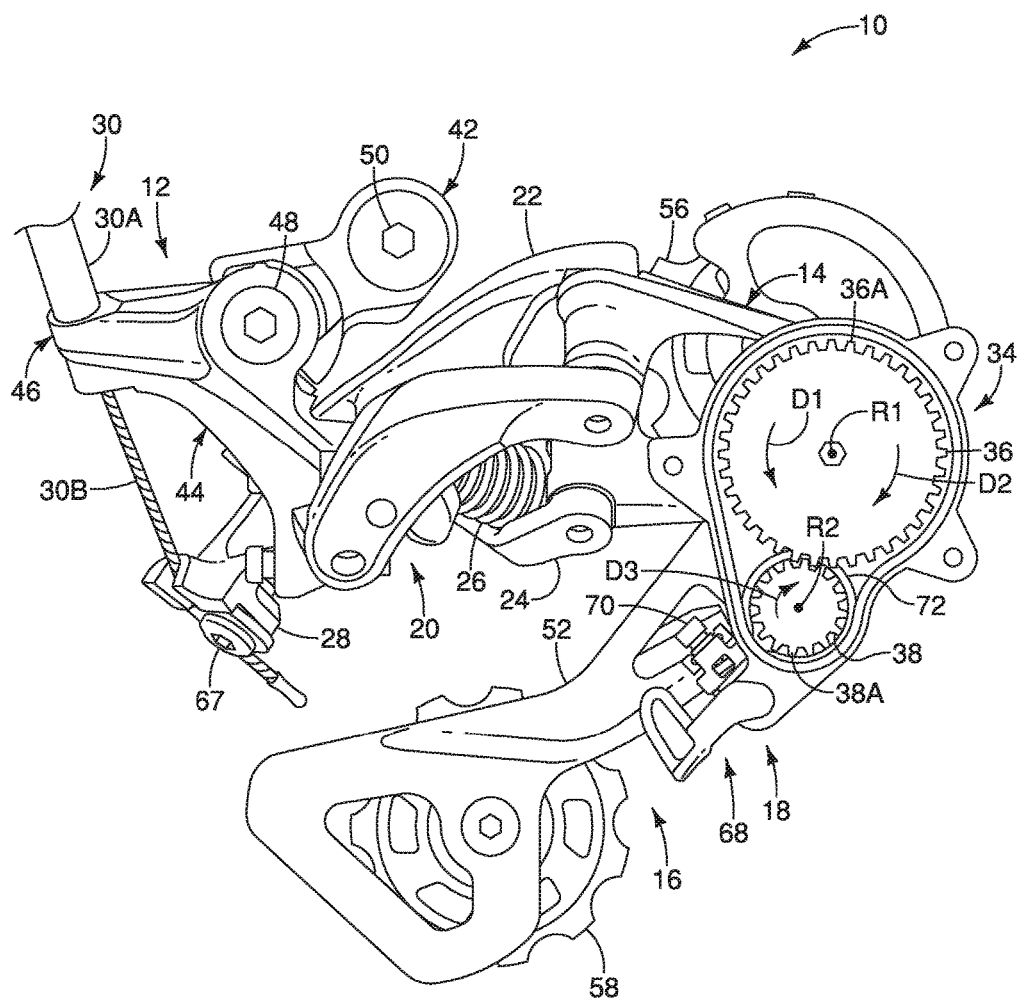
FIG. 3 is an enlarged outer side elevational view of the rear derailleur in accordance with FIGS. 1 and 2 with a protective cover of the speed changing mechanism removed to show the speed changing mechanism with a chain guide in a top gear position.
Figure 4:
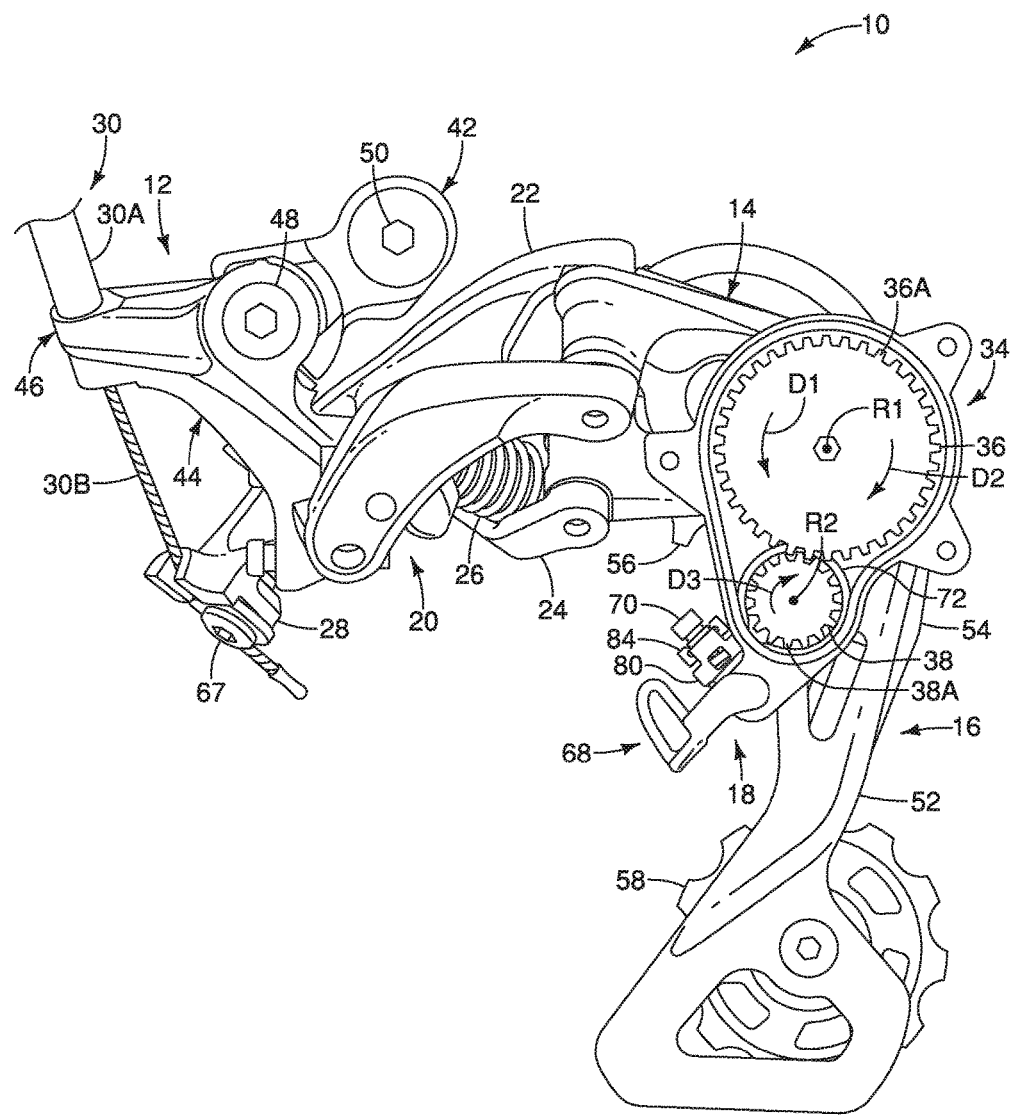
FIG. 4 is an enlarged outer side elevational view of the rear derailleur similar to FIG. 3 but with the chain guide being rotated as a result of chain bounce from the position shown in FIGS. 2 and 3.
Figure 5:
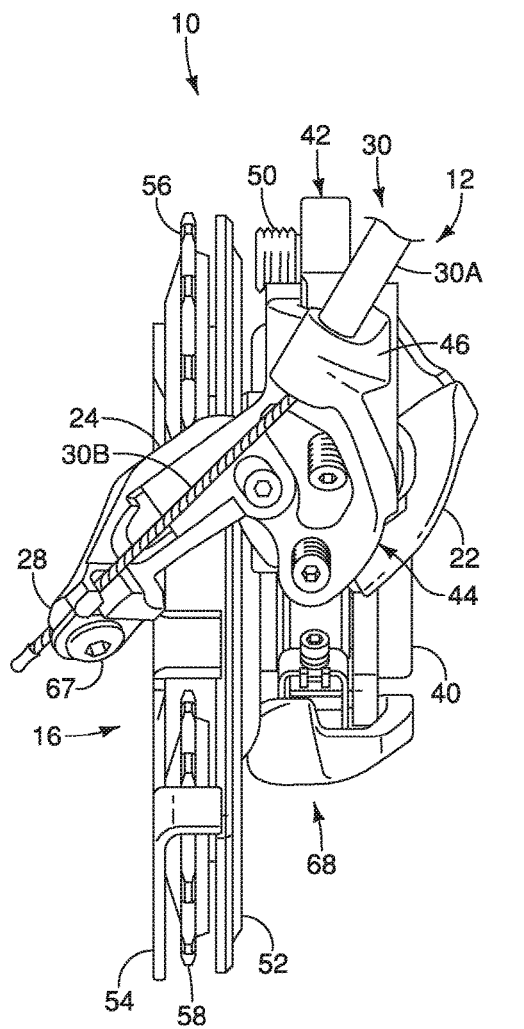
FIG. 5 is a rear end elevational view of the rear derailleur of FIGS. 1 to 4.
Figure 6:
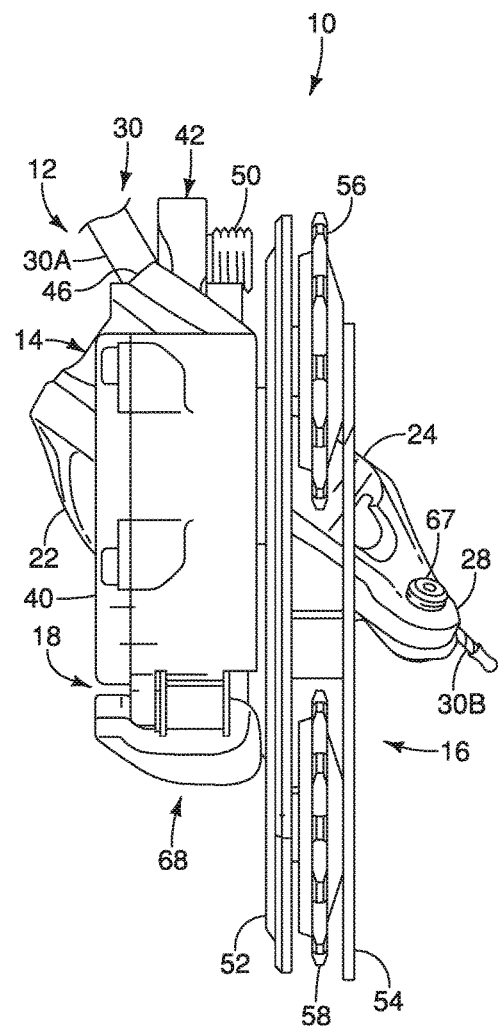
FIG. 6 is a front end elevational view of the rear derailleur of FIGS. 1 to 4.

As best seen in FIGS. 3 and 4, the speed changing mechanism 34 includes a first torque transmitting wheel 36 and a second torque transmitting wheel 38. The first torque transmitting wheel 36 is rotatably arranged around the first rotational axis R1. The second torque transmitting wheel 38 is rotatably arranged around the second rotational axis R2. The second rotational axis R2 is offset from the first rotational axis R1. Preferably, the first and second rotational axes R1 and R2 are parallel to each other. Thus, the resistance applying structure 18 is offset from the first rotational axis R1. In this way, the resistance applying structure 18 applies the frictional resistance to the chain guide 16 via application of frictional resistance to the second torque transmitting wheel 38, as will be further discussed below. Also, as will be further explained below, the resistance applying structure 18 applies a frictional resistance to the second torque transmitting wheel 38 as it rotates in a third rotational direction D3 about the second rotational axis R2. Preferably, the rear derailleur 10 includes a protective cover 40 mounted to the movable member 14 in a conventional manner to protect and enclose the speed changing mechanism 34.

Referring back to FIG. 1, the base member 12 will now be discussed. The base member 12 is configured to be mounted to the bicycle frame F. In particular, the base member 12 is configured to be releasably mounted to the bicycle frame F. The base member 12 is a rigid member made of a suitable material such as a metallic material or a fiber reinforced plastic material. Basically, the base member 12 includes a bracket axle unit 42, a main body portion 44 and an outer casing support portion 46. The bracket axle unit 42 pivotally supports the main body portion 44 and the outer casing support portion 46 at a B-axle 48. The bracket axle unit 42 is fixed to a hanger portion of the bicycle frame F via a fixing bolt 50. The bracket axle unit 42 is a stationary (non-movable) member relative to the bicycle frame F. The main body portion 44 is configured and arranged to be pivotally mounted to the bracket axle unit 42 for limited pivotal movement relative thereto. The outer casing support portion 46 supports one end of the outer casing 30A of the control cable 30.

The movable member 14 is movably coupled to the base member 12. The movable member 14 is movably connected to the base member 12 by the linkage assembly 20. The chain guide 16 is pivotally mounted to the movable member 14 so that the chain guide 16 can pivot about the first rotational axis R1. The movable member 14 is a rigid member made of a suitable material such as a metallic material or a fiber reinforced plastic material. The resistance applying structure 18 and the speed changing mechanism 34 are mounted on the movable member 14, as will be further discussed below.

Figure 7:
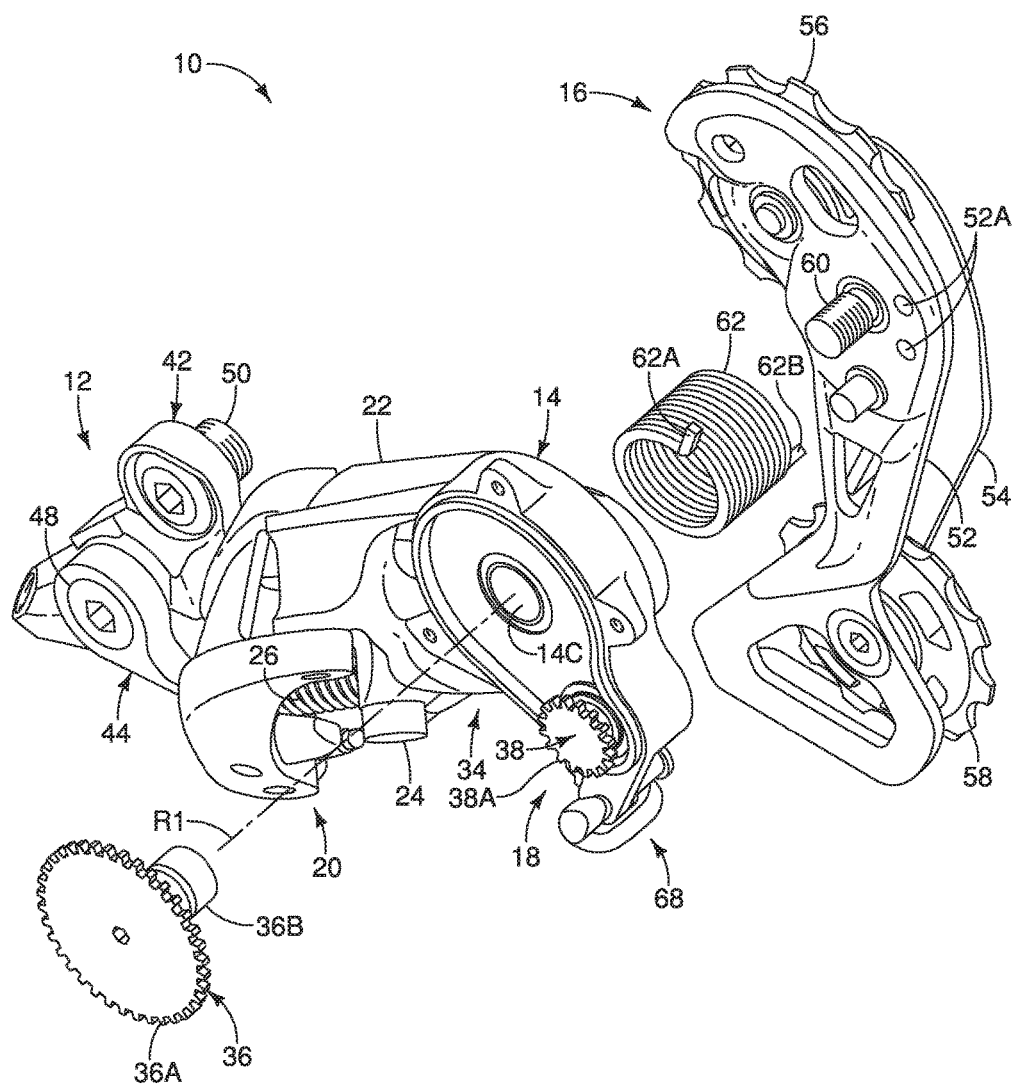
FIG. 7 is an enlarged perspective view of the rear derailleur of FIGS. 1 to 6, with the chain guide and a portion of the speed changing mechanism exploded from a movable member of the rear derailleur.

The chain guide 16 will now be discussed with reference to FIGS. 7 and 8. The chain guide 16 basically includes a first (outer) chain cage plate 52, a second (inner) chain cage plate 54, a first (guide) pulley 56 and a second (tension) pulley 58. The first and second chain cage plates 52 and 54 define a chain receiving slot for receiving the bicycle chain C. The first and second pulleys 56 and 58 are both rotatably disposed between the chain cage plates 52 and 54. The chain guide 16 is rotatably coupled to the movable member 14 around the first rotational axis R1. As best seen in FIG. 7, the chain guide 16 is coupled to the movable member 14 via a threaded mounting axle 60, The threaded mounting axle 60 is attached to the first torque transmitting wheel 36. In this way, the first torque transmitting wheel 36 and the chain guide 16 move together as a unit around the first rotational axis R1. In other words, the chain guide 16 pivots relative to the movable member 14 about the first rotational axis R1.

Figure 2:
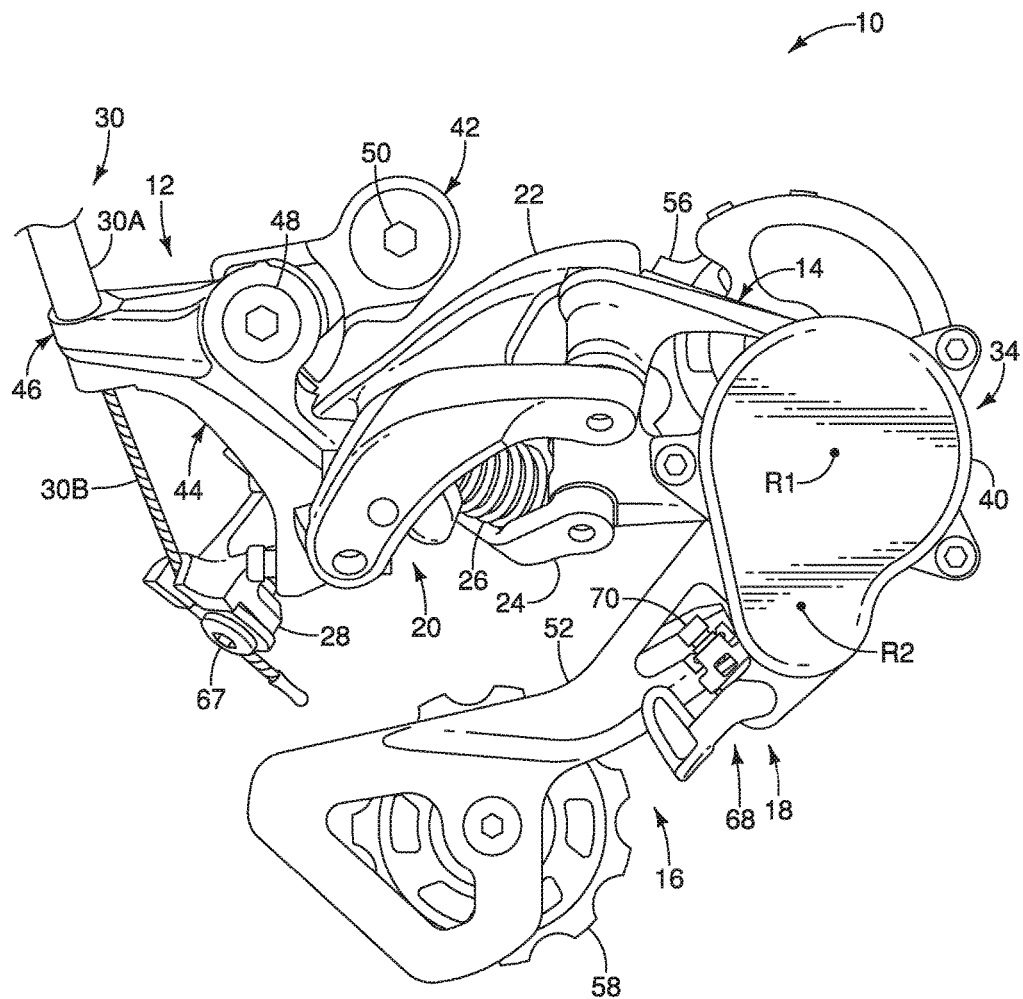
FIG. 2 is an enlarged outer side elevational view of the rear derailleur of FIG. 1.

As best seen in FIG. 7, a biasing member 62 is interposed between the chain guide 16 and the movable member 14 to bias the chain guide 16 around the first rotational axis R1 in the second rotational direction D2. As stated previously, the resistance applying structure 18 applies the frictional resistance to the rotation of the chain guide in the first rotational direction D1 that is opposite the direction of the biasing force applied by the biasing member 62 in the second rotational direction D2. In the illustrated embodiment, the second rotational direction D2 is a clockwise rotational direction of the chain guide 16 around the first rotational axis R1 while being viewed along the first rotational axis R1 from the non-frame facing side of the movable member 14. As seen in FIG. 8, the movable member has a spring receiving recess 14A for receiving the biasing member 62. In this illustrated embodiment, the biasing member 62 is a torsion spring having a first end 62A disposed in a notch 14B in the movable member 14 and a second end 62B disposed in an opening 52A in the chain guide 16. The biasing member 62 has a coiled portion 62C that is disposed around the first rotational axis R1, Referring to FIGS. 2 and 4, the linkage assembly 20 will now be discussed. As stated above, the linkage assembly 20 includes the first link 22 and the second link 24. In the illustrated embodiment, the first link 22 is an inner link of the linkage assembly 20 and the second link 24 is an outer link of the linkage assembly 20. Also, as previously stated, the rear derailleur 10 includes the cable attachment portion 28 to which the control cable 30 is attached. In particular, the second link 24 of the linkage assembly 20 includes the cable attachment portion 28. The inner wire 30B of the control cable 30 is adjustably attached to the cable attachment portion 28 via a bolt 67. As shown, the base member 12, the movable member 14, the first and second links 22 and 24 form a four-bar linkage arranged to move the chain guide 16 laterally between a plurality of shift positions (e.g., at least a first position and a second position) in a conventional manner.

The resistance applying structure 18 will now be discussed with reference to FIGS. 10 to 15. The resistance applying structure 18 includes a friction switch 68 (i.e., a first resistance control element) and an adjustment screw 70 (i.e., a second resistance control element). The resistance applying structure 18 further includes a friction band 72 (i.e., a friction applying member) and a friction applied member, which is formed by part of the one-way clutch 32 in the illustrated embodiment. Preferably, the frictional resistance (i.e., rotational resistance) applied by the resistance applying structure 18 is adjustable. By operating the friction switch 68 and/or adjustment of the adjustment screw 70, the user can adjust a degree of frictional resistance applied by the resistance applying structure 18 to the chain guide 16. In other words, the frictional resistance applied by the friction band 72 to the one-way clutch 32 is adjusted via operation of the friction switch 68 and/or the adjustment screw 70. Specifically, the friction band 72 includes a first free end 72A, a second free end 72B and a band portion 72C. The first and second free ends 72A and 72B are squeezed together during operation of the friction switch 68 and/or the adjustment screw 70 to adjust the frictional resistance applied by the band portion 72C to the one-way clutch 32.

Figure 10:
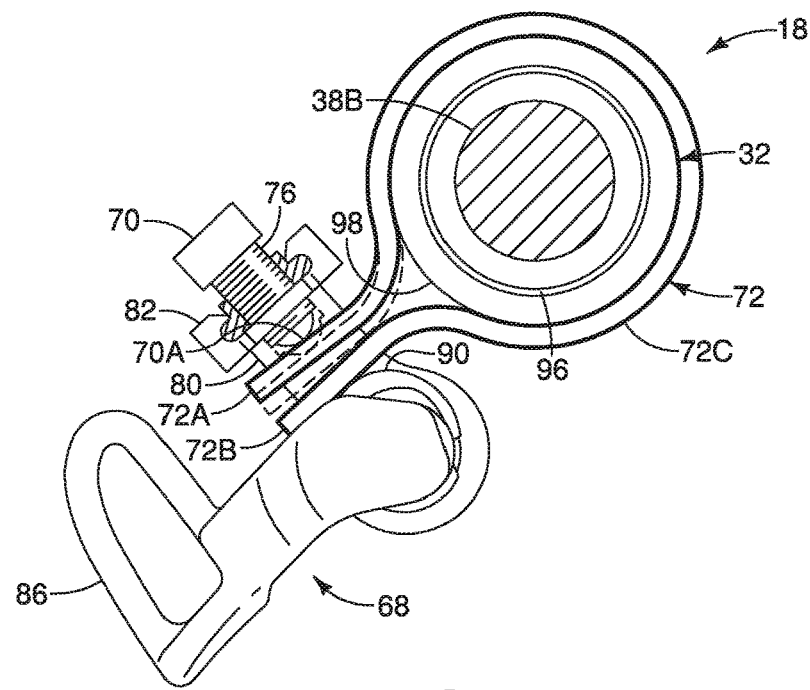
FIG. 10 is an enlarged elevational view of the resistance applying structure of the rear derailleur of FIGS. 1 to 8, with a portion broken away to show first and second resistance control elements in first positions and to illustrated the second resistance control element adjusted to the second position.
Figure 11:
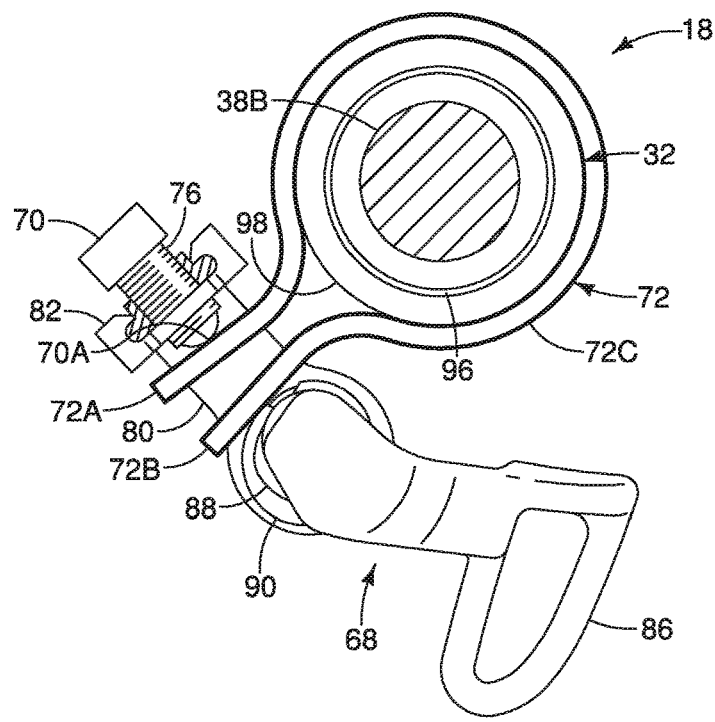
FIG. 11 is an enlarged elevational view of the resistance applying structure similar to FIG. 10, with the first resistance control element in a second position and the second resistance control element in the first position.
Figure 12:
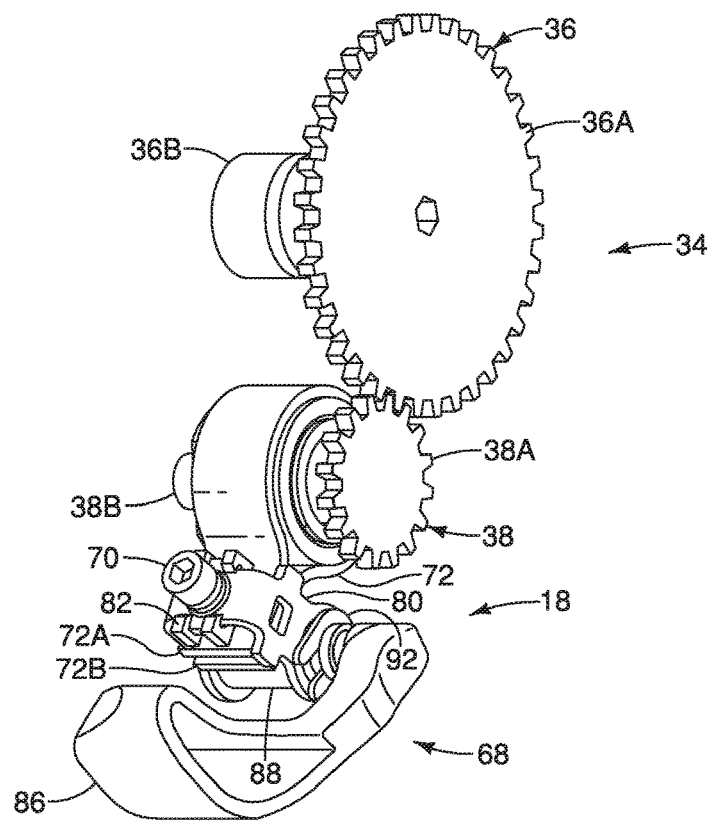
FIG. 12 is an enlarged perspective view of the resistance applying structure and the speed changing mechanism.

As best seen in FIGS. 10 and 11, the band portion 72C of the friction band 72 applies resistance to the second torque transmitting wheel 38 when the second torque transmitting wheel 38 rotates in the third rotational direction D3 so that the rotation of the chain guide 16 becomes more difficult in the first rotational direction D1. The one-way clutch 32 is operatively disposed between the movable member 14 and the chain guide 16 such that frictional resistance is applied as the chain guide 16 rotates about the first rotational axis R1 in the first rotational direction D1 but not as the chain guide 16 rotates in the second rotational direction D2.

Preferably, the friction band 72 is a metallic material that is resiliently deformable between a resistance applying position (FIG. 10) and a free position (FIG 11). Thus, the friction applying structure 18 (e.g., the friction band 72 and part of the one-way clutch 32) applies the frictional resistance to the rotational movement of the chain guide 16. Specifically, in the illustrated embodiment, an outer surface of the one-way clutch 32 that contacts the friction band 72 operates as the friction applied member. In the illustrated embodiment, the friction applied member is an integral part of the one-way clutch 32. It will be apparent to those skilled in the bicycle field from this disclosure that the friction applied member can be a separate member from the one-way clutch 32. As shown, one of the friction applying member and the friction applied member is rotatable around the second rotational axis R2 that is offset from the first rotational axis R1.

Basically, the friction switch 68 acts as an ON/OFF switch, while the adjustment screw 70 provides a fine adjustment of the level of frictional resistance. As stated, the adjustment screw 70 squeezes the first and second free ends 72A and 72B of the friction band 72 together to obtain the desired frictional resistance. As shown in FIGS. 12 to 15, the adjustment screw 70 includes a threaded shaft 76 that is received in a threaded bore 78 (FIG. 15) of a bracket 80 and a nut member 82. The bracket 80 includes a pair of receiving openings 84 which pivotally supports the friction switch 68. An end 70A of the adjustment screw 70 contacts the first free end 72A of the friction band 72 to squeeze the first and second free ends 72A and 72B together to increase the application of friction force by the friction band 72 to the one-way clutch 32. The adjustment screw 70 is adjustable into and out of the bracket 80 in an infinite number of adjustment positions.

As stated, the friction switch 68 also squeezes the first and second free ends 72A and 72B of the friction band 72 together to obtain the user's desired frictional resistance. The friction switch 68 includes a handle 86 and a cam member 88. The cam member 88 is non-rotatably coupled to the handle 86. Thus, operation of the handle 86 turns the cam member 88. The cam member 88 is pivotally received in the openings 84 of the bracket 80. The cam member 88 has a camming surface 90 that is configured to contact the second free end 72B of the friction band 72. By operating the handle 86 of the friction switch 68, the cam member 88 is rotated such that the camming surface 90 causes the first and second ends 72A and 72B of the friction band 72 to be squeezed together. The friction switch 68 is movable between a first position (ON position) that applies a frictional resistance of the friction band 72 against the one-way clutch 32 (FIG. 10), and a second position (OFF position) that applies substantially zero frictional resistance (FIG. 11). The friction switch 68 is secured to the movable member 14 by a fixing plate 92.

In the illustrated embodiment, the adjustment screw 70 is an example of a first resistance control element and the friction switch 68 is an example of a second resistance control element. Thus, the resistance applying structure 18 includes a resistance control element (e.g., the adjustment screw 70 and/or the friction switch 68) that moves between at least the first position and the different second position. In the case of the adjustment screw 70, the first and second positions can be any of the infinite number of adjustment positions that can be obtained by turning the adjustment screw 70. In FIG. 10, a first position of the adjustment screw 70 is shown in full lines and a second position is shown in dashed lines. In the case of the friction switch 68, the handle 86 is turned to the first or ON position (or friction applying position) which is shown in FIG. 10, and turned to the second or OFF position (no friction applying position) which is shown in FIG. 11. In the first position, the band portion 72C tightly contacts the outer surface of the one-way clutch 32. In the second position, the band portion 72C is preferably spaced from the outer surface of the one-way clutch 32. The resistance applying structure 18 applies a first resistance to rotational movement of the chain guide 16 when the resistance control element is disposed in the first position. The resistance applying structure 18 applies a different second resistance to rotational movement of chain guide 16 when the resistance control element is disposed in the second position. In this way, the resistance control element (e.g., the friction switch 68 and/or the adjustment screw 70) is operatively coupled to the resistance applying member (e.g., the friction band 72).

Figure 14:
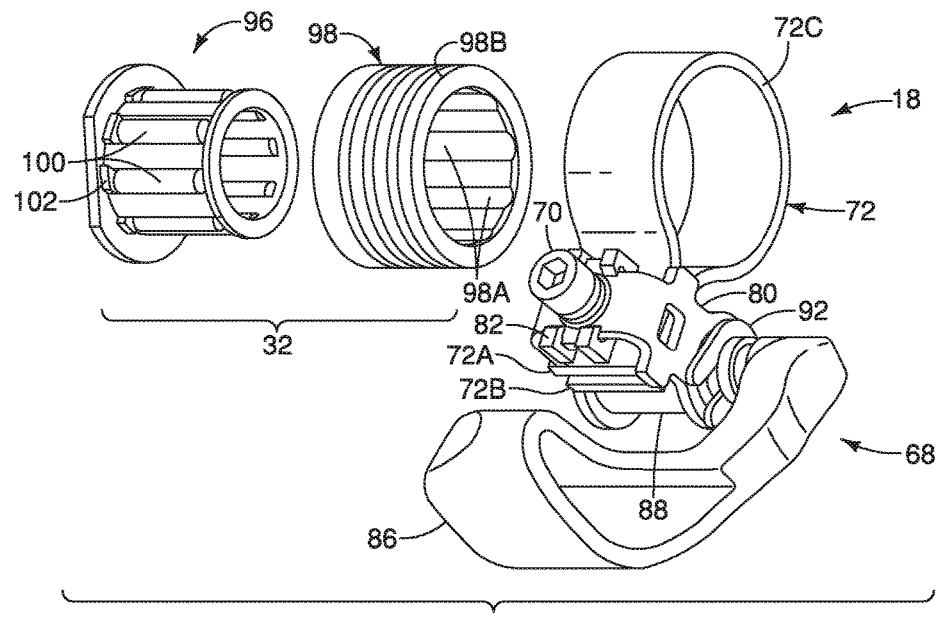
FIG. 14 is an enlarged perspective view of the resistance applying structure and a one-way clutch shown in exploded view.
Figure 15:
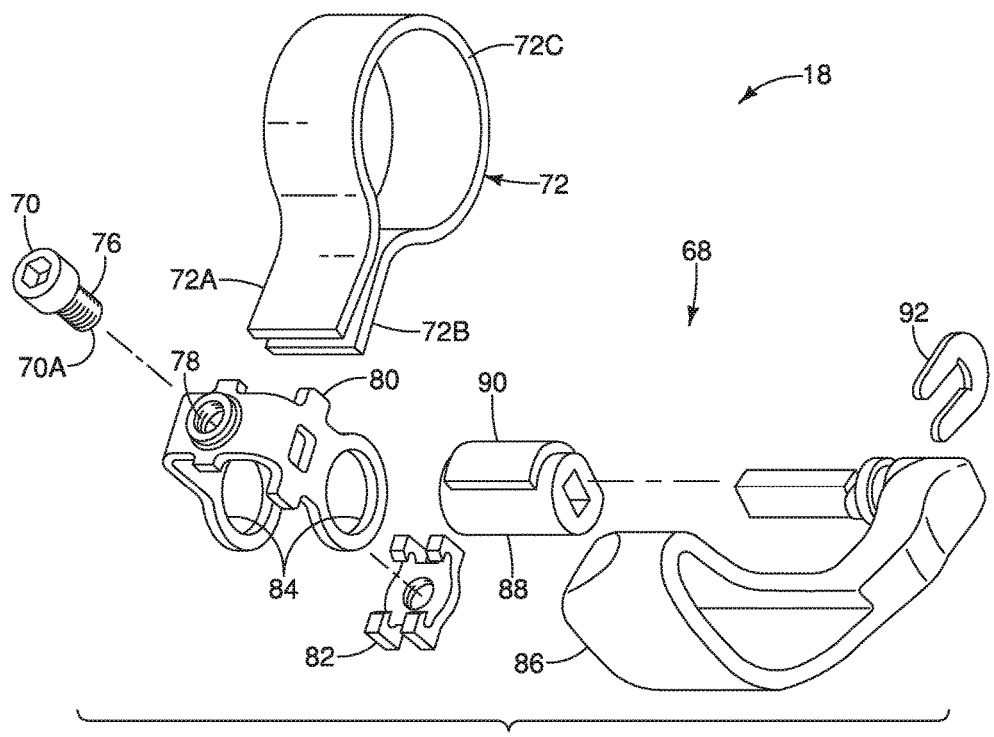
FIG. 15 is an enlarged perspective view of the resistance applying structure being partially exploded.

Referring to FIGS. 10, 11 and 14, the one-way clutch 32 includes an inner race 96, an outer race 98 and a plurality of rollers 100. Since the one-way clutch 32 is conventional and discussed in detail in U.S. Pat. No. 8,879,692, the one-way clutch 32 will only be briefly discussed herein. The rollers 100 are biased outwardly by a spring 102 (FIG. 14) to operatively engage a plurality of recesses 98A of the outer race 98. Specifically, the rollers 100 operatively move into and out of the recesses 98A as the one-way clutch 32 moves between a disengaged state and an engaged state. The outer race 98 has an outer surface 98B that is squeezed by the band portion 72C of the friction band 72 during operation of the friction switch 68 to apply the frictional resistance applied by the band portion 72C to the outer race 98 of the one-way clutch 32. Thus, in this embodiment, the one-way clutch 32 is a roller clutch, which is engaged to transmit friction resistance as the chain guide 16 rotates about the first rotational axis R1 in the first rotational direction D1. In the engaged state, the rollers 100 of the one-way clutch 32 are moved of the recesses 98A to lock the inner and outer races 96 and 98 together. The one-way clutch 32 is disengaged as the chain guide 16 moves in the second rotational direction D2 with respect to the movable member 14. In the disengaged state, the rollers 100 are disposed in the recesses 98A. Thus, when the one-way clutch 32 disengaged, the chain guide 16 can freely rotate relative to the movable member 14 without receiving the rotational resistance of the resistance applying structure 18.

The speed changing mechanism 34 will now be further discussed herein with reference to FIGS. 3, 4 and 7-9. As stated, the speed changing mechanism 34 is configured to transmit the rotational movement of the chain guide 16 to the resistance applying structure 18. The first torque transmitting wheel 36 includes a plurality of first transmitting teeth 36A, and the second torque transmitting wheel 38 includes a plurality of second transmitting teeth 38A. As shown, the first torque transmitting wheel 36 and the second torque transmitting wheel 38 are rotatably connected to each other.

In the illustrated embodiment, the first torque transmitting wheel 36 and the second torque transmitting wheel 38 are directly engaged with each other by the first and second transmitting teeth 36A and 38A. However, it will be apparent to those skilled in the art from this disclosure that the torque from the first torque transmitting wheel 36 can be transmitted to the second torque transmitting wheel by a transmitting belt that is operatively engaged with the first and second torque transmitting wheels 36 and 38, which act as pulleys instead of gears. Alternatively, the first and second torque transmitting wheels 36 and 38 can he replaced with a planetary gear mechanism having a center rotational axis that is concentrically arranged with the first rotational axis R1.

Figure 9:
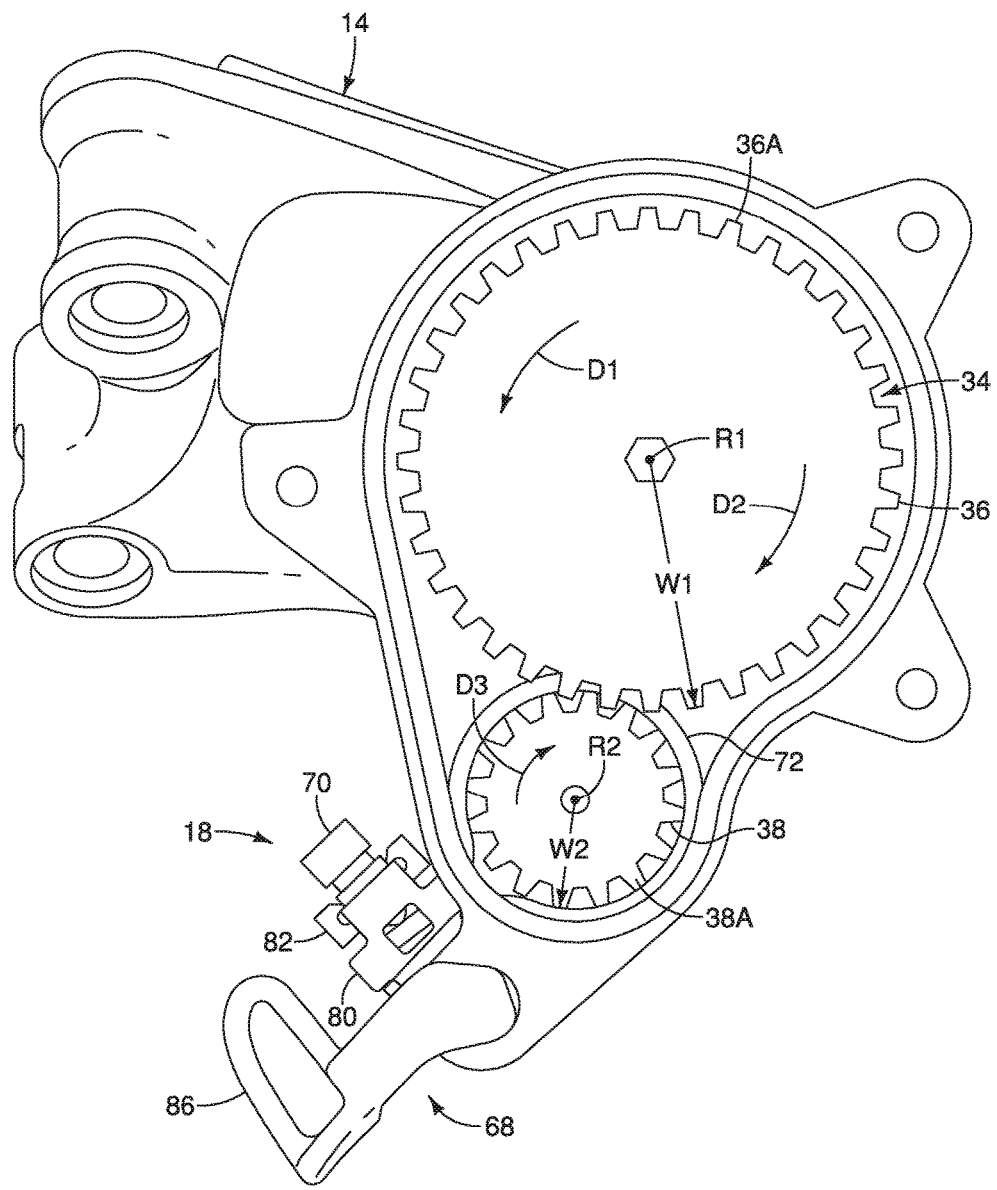
FIG. 9 is an enlarged elevational view of a portion of the movable member of the rear derailleur of FIGS. 1 to 8, showing the speed changing mechanism and the resistance applying structure.

As best seen in FIGS. 7 to 9, the first torque transmitting wheel 36 is rotatably mounted to the movable member 14 about the first rotational axis R1. The first torque transmitting wheel 36 includes a first shaft 36B that is received by a receiving bore 14C of the movable member 14. The first shaft 36B of the first torque transmitting wheel 36 includes inner threads 36C (FIG. 8) that engage the threaded mounting axle 60 of the chain guide 16.

Figure 13:
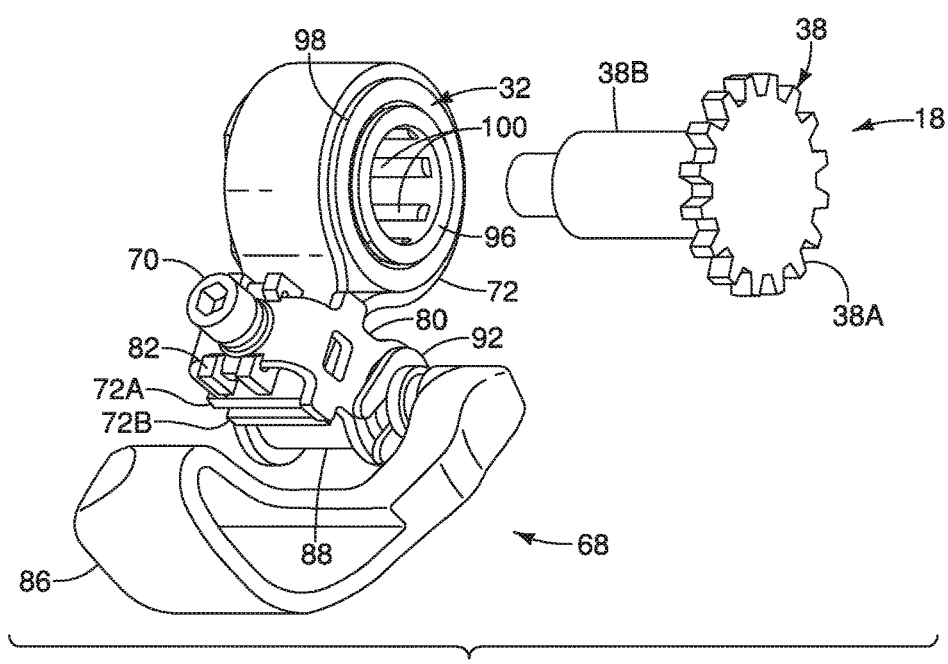
FIG. 13 is an enlarged perspective view of the resistance applying structure and a portion of the speed changing mechanism exploded from the resistance applying structure.

Referring now to FIG. 13, the second torque transmitting wheel 38 includes a second shaft 38B that is received inside the inner race 96 of the one-way clutch 32. Here, the second shaft 38B is press-fitted into the inner race 96 so they rotate as a unit. In this way, the second torque transmitting wheel 38 rotatably engages the one-way clutch 32. Thus, when the friction switch 68 is in the ON or first position, the resistance applying structure 18 applies frictional resistance force to the one-way clutch 32. The one-way clutch 32 transmits the frictional resistance force to the second torque transmitting wheel 38, which transmits frictional resistance to the first torque transmitting wheel 36, which then transmits the frictional resistance to the chain guide 16.

Preferably, the first and second torque transmitting wheels 36 and 38 are rigid gears that can be made of metallic or non-metallic materials as needed and/or desired. Thus, the first torque transmitting wheel 36 and the second torque transmitting wheel 38 can be made of a metallic material or a non-metallic material. The first torque transmitting wheel 36 has a first diameter W1. In the illustrated embodiment, the second torque transmitting wheel 38 has a second diameter W2 that is different from the first diameter W1. The first diameter W1 is larger than the second diameter W2. Thus, a first total tooth number of the first transmitting teeth 36A is different from a second total tooth number of the second transmitting teeth. The first total tooth number of the first transmitting teeth 36A is larger than the second total tooth number of the second transmitting teeth 38A. Preferably, the first diameter W1 is twice as large as the second diameter W2. The first total tooth number is twice as many as the second total tooth number.

Figure 16:
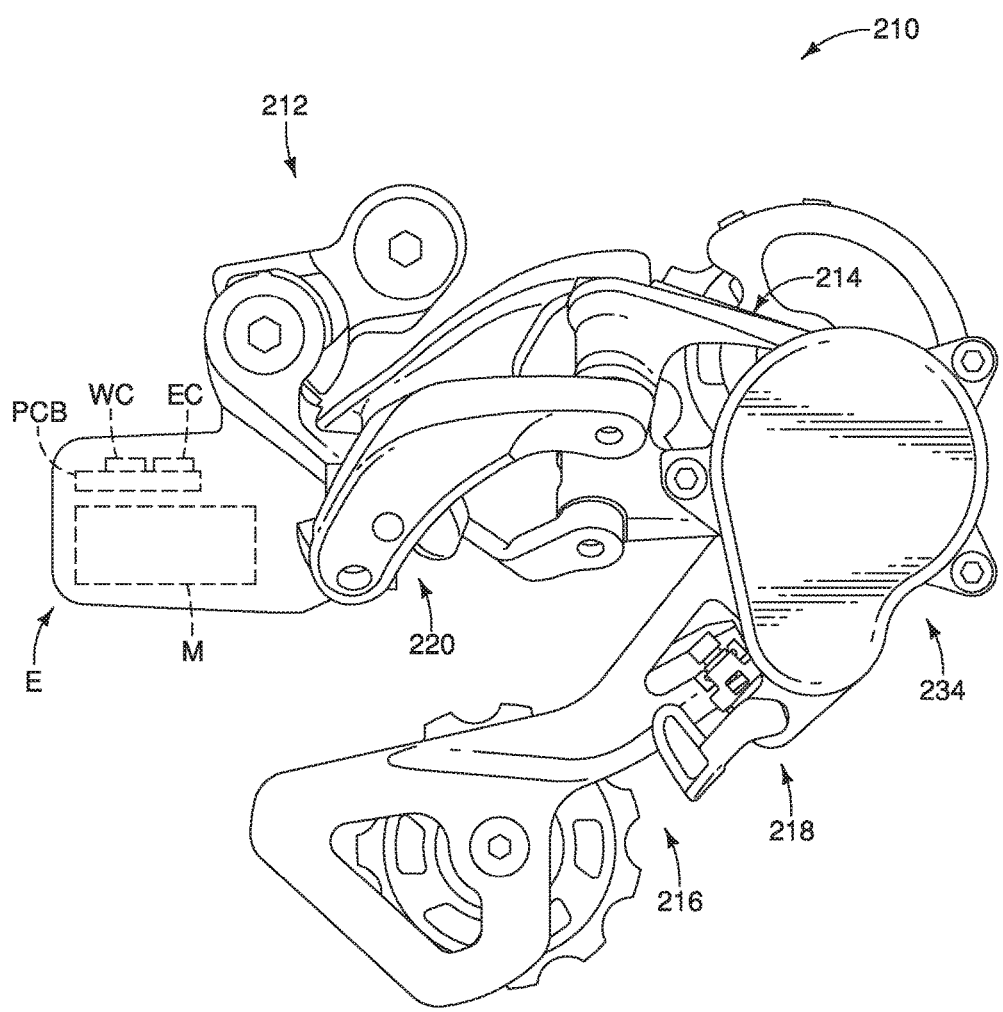
FIG. 16 is a bicycle rear derailleur in accordance with a second illustrated embodiment having a resistance applying structure, an electric actuator and a wireless communication unit.

Referring now to FIG. 16, a bicycle rear derailleur 210 is illustrated in accordance with a second embodiment. The bicycle rear derailleur 210 is identical to the bicycle rear derailleur 10, which is discussed above, except that the bicycle rear derailleur 210 is an electric rear derailleur that receives wireless control signals instead of being a cable operated rear derailleur as in the first embodiment. In view of the similarities between the bicycle rear derailleurs 10 and 210, the following description of the bicycle rear derailleur 210 will only focus on the differences of the bicycle rear derailleur 210 from the bicycle rear derailleur 10.

Thus, the bicycle rear derailleur 210 basically comprises a base member 212, a movable member 214, a chain guide 216, and a resistance applying structure 218. The bicycle rear derailleur 210 further includes a linkage assembly 220 and a speed changing mechanism 234. The movable member 214, the chain guide 216 and the resistance applying structure 218 are identical to the movable member 14, the chain guide 16 and the resistance applying structure 18 of the first embodiment. Thus, these components will not be discussed in detail herein. Here, the base member 212 has been modified such that the base member 212 includes an electric unit E including an electrical actuator M and a printed circuit board PCB with an electronic controller EC and the wireless communication unit WC. Therefore, the base member 212 has been modified such that the bicycle rear derailleur 210 further includes the electrical actuator M and the wireless communication unit WC. The electric unit E is arranged inside the base member 212. The electrical actuator M is configured to move the movable member 214 relative to the base member 212. The electrical actuator M is a reversible electric motor as one example. The electronic controller EC is preferably a micro-computer that includes conventional components such as includes a central processing unit (CPU), an input interface circuit, an output interface circuit, and storage devices such as a ROM (Read Only Memory) device, a RAM (Random Access Memory) device and/or a FLASH memory device. The electronic controller EC is programmed to process signals such as upshifting signals and downshifting signals for shifting from an electric shifter.

In particular, the wireless communication unit WC is configured to receive a control signal (an upshifting signal or downshifting signals) to operate the electrical actuator M. The term "wireless communication unit" as used herein includes a transceiver or a transmitter-receiver, and contemplates any device or devices, separate or combined, capable of transmitting and receiving wireless signals, including shift, signals or control, command or other signals related to some function of the component being controlled. Thus, the wireless communication unit WC is a two-way wireless communication unit. The wireless communication unit WC is arranged inside the base member 212. Therefore, the base member 212 as least partly made of a material which is capable of transmitting a radio wave. While the rear derailleur 210 includes a wireless communication unit WC, it will be apparent to those skilled in the bicycle field from this disclosure that the rear derailleur 210 can be electrically connected to an operating device by an electrical wire.

In understanding the scope of the present invention, the term "comprising" and its derivatives, as used herein, are intended to be open ended terms that specify the presence of the stated features, elements, components, groups, etc., but do not exclude the presence of other unstated features, elements, components, groups, etc. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", " side", "vertical", "horizontal", "perpendicular" and "transverse" as well as any other similar directional terms refer to those directions of a bicycle in an upright, riding position and equipped with the the rear derailleur. Accordingly, these directional terms, as utilized to describe the rear derailleur should be interpreted relative to a bicycle in an upright riding position on a horizontal surface and that is equipped with the rear derailleur.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle rear derailleur comprising:
   a base member configured to be mounted to a bicycle;
   a movable member movably coupled to the base member;
   a chain guide rotatably coupled to the movable member around a first rotational axis; and
   a resistance applying structure including a friction applying member that applies a frictional resistance to rotational movement of the chain guide, the friction applying member being disposed around a second rotational axis that is offset from the first rotational axis.

2. The bicycle rear derailleur according to claim 1, further comprising
   a speed changing mechanism configured to transmit the rotational movement of the chain guide to the resistance applying structure.

3. The bicycle rear derailleur according to claim 2, wherein
   the speed changing mechanism includes
      a first torque transmitting wheel rotatably arranged around the first rotational axis, and
      a second torque transmitting wheel rotatably arranged around the second rotational axis.

4. The bicycle rear derailleur according to claim 3, wherein
   the first torque transmitting wheel and the second torque transmitting wheel are rotatably connected to each other.

5. The bicycle rear derailleur according to claim 4, wherein
   the first torque transmitting wheel and the second torque transmitting wheel are directly engaged with each other.

6. The bicycle rear derailleur according to claim 5, wherein
   the first torque transmitting wheel includes a plurality of first transmitting teeth, and
   the second torque transmitting wheel includes a plurality of second transmitting teeth that engage with the first transmitting teeth.

7. The bicycle rear derailleur according to claim 6, wherein
   a first total tooth number of the first transmitting teeth is different from a second total tooth number of the second transmitting teeth.

8. The bicycle rear derailleur according to claim 7, wherein
   the first total tooth number of the first transmitting teeth is larger than the second total tooth number of the second transmitting teeth.

9. The bicycle rear derailleur according to claim 8, wherein
   the first total tooth number is twice as many as the second total tooth number.

10. The bicycle rear derailleur according to claim 3, wherein
    the first torque transmitting wheel has a first diameter, and the second torque transmitting wheel has a second diameter that is different from the first diameter.

11. The bicycle rear derailleur according to claim 10, wherein
the first diameter is larger than the second diameter.

12. The bicycle rear derailleur according to claim 11, wherein
the first diameter is twice as large as the second diameter.

13. The bicycle rear derailleur according to claim 3, wherein
the first torque transmitting wheel and the second torque transmitting wheel are made of a metallic material.

14. The bicycle rear derailleur according to claim 3, wherein
the first torque transmitting wheel and the second torque transmitting wheel are made of a non-metallic material.

15. The bicycle rear derailleur according to claim 1, further comprising
a one-way clutch operatively coupled between the movable member and the chain guide to transmit the frictional resistance of the friction applying member to rotational movement of the chain guide in a predetermined direction.

16. The bicycle rear derailleur according to claim 15, wherein
the resistance applying structure includes the one-way clutch.

17. The bicycle rear derailleur according to claim 1, further comprising
a cable attachment portion to which a mechanical control cable is attached.

18. The bicycle rear derailleur according to claim 1, further comprising
an electrical actuator to move the movable member relative to the base member.

19. The bicycle rear derailleur according to claim 18, further comprising
a wireless communication unit configured to receive a control signal to operate the electrical actuator.

20. The bicycle rear derailleur according to claim 1, wherein
the resistance applying structure includes a resistance control element that moves between at least a first position and a different second position; and
the resistance control element is operatively coupled to the resistance applying member, the resistance applying structure applies a first resistance to rotational movement of the chain guide when the resistance control element is disposed in the first position, and the resistance applying structure applies a different second resistance to rotational movement of the chain guide when the resistance control element is disposed in the second position.

21. A bicycle rear derailleur comprising:
a base member configured to be mounted to a bicycle;
a movable member movably coupled to the base member;
a chain guide rotatably coupled to the movable member around a first rotational axis;
a resistance applying structure including a friction applying member that applies a frictional resistance to rotational movement of the chain guide; and
a speed changing mechanism configured to transmit the rotational movement of the chain guide to the resistance applying structure, the friction applying member applying frictional resistance to the speed changing mechanism at a second rotational axis that is offset from the first rotational axis.

22. A bicycle rear derailleur comprising:
a base member configured to be mounted to a bicycle;
a movable member movably coupled to the base member;
a chain guide rotatably coupled to the movable member around a first rotational axis; and
a resistance applying structure including a friction applying member that applies a frictional resistance to rotational movement of the chain guide, the resistance applying structure being offset from the first rotational axis,
the resistance applying structure further including a friction applied member,
one of the friction applying member and the friction applied member is rotatable around a second rotational axis that being offset from the first rotational axis.

* * * * *